United States Patent [19]

Reimert

[11] 4,407,527
[45] Oct. 4, 1983

[54] SELF-ALIGNING CONNECTOR ASSEMBLY
[75] Inventor: Larry E. Reimert, Houston, Tex.
[73] Assignee: Dril-Quip, Inc., Houston, Tex.
[21] Appl. No.: 295,679
[22] Filed: Aug. 24, 1981
[51] Int. Cl.³ .............................................. F16L 15/00
[52] U.S. Cl. .................................... 285/27; 285/115; 285/334
[58] Field of Search ................... 285/115, 27, 24, 334, 285/333, 390, 355

[56] References Cited
U.S. PATENT DOCUMENTS

| | | | |
|---|---|---|---|
| 1,161,780 | 11/1915 | McClelland | 285/115 |
| 1,549,757 | 8/1925 | Farmer | 285/390 X |
| 1,637,628 | 8/1927 | Weisgerber | 285/27 |
| 1,880,269 | 10/1932 | Murray | 285/27 |
| 1,933,749 | 11/1933 | Murray | 285/115 |
| 4,154,466 | 5/1979 | Simmons | 285/390 X |

FOREIGN PATENT DOCUMENTS

| | | | |
|---|---|---|---|
| 1141071 | 3/1957 | France | 285/333 |
| 1386467 | 12/1964 | France | 285/333 |
| Ad.11725 | of 1902 | United Kingdom | 285/390 |

Primary Examiner—Thomas F. Callaghan
Attorney, Agent, or Firm—Browning, Bushman, Zamecki & Anderson

[57] ABSTRACT

Connector apparatus includes a guide surface spaced from internal threads on one member for receiving external threads on a second member, whereby the two members may be threadedly engaged with the guide surface constraining relative orientation between the two members prior to threaded engagement to avoid cross-threading.

4 Claims, 5 Drawing Figures

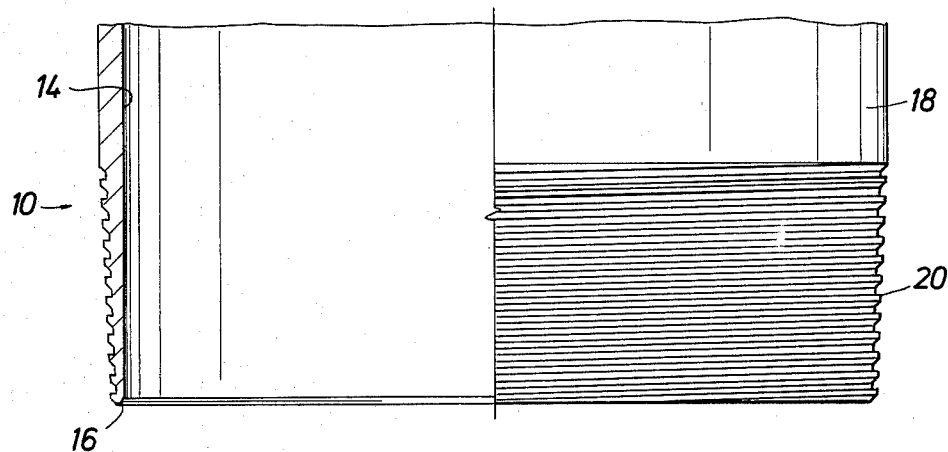
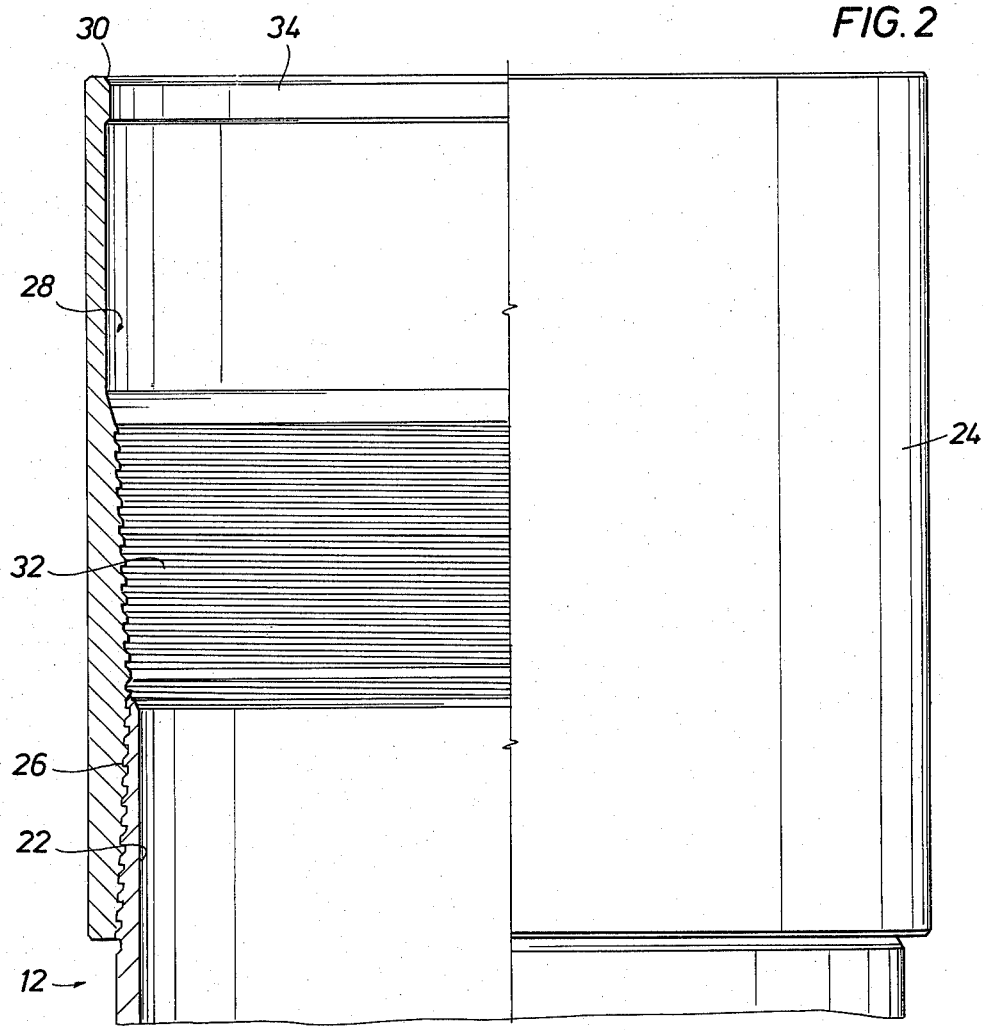

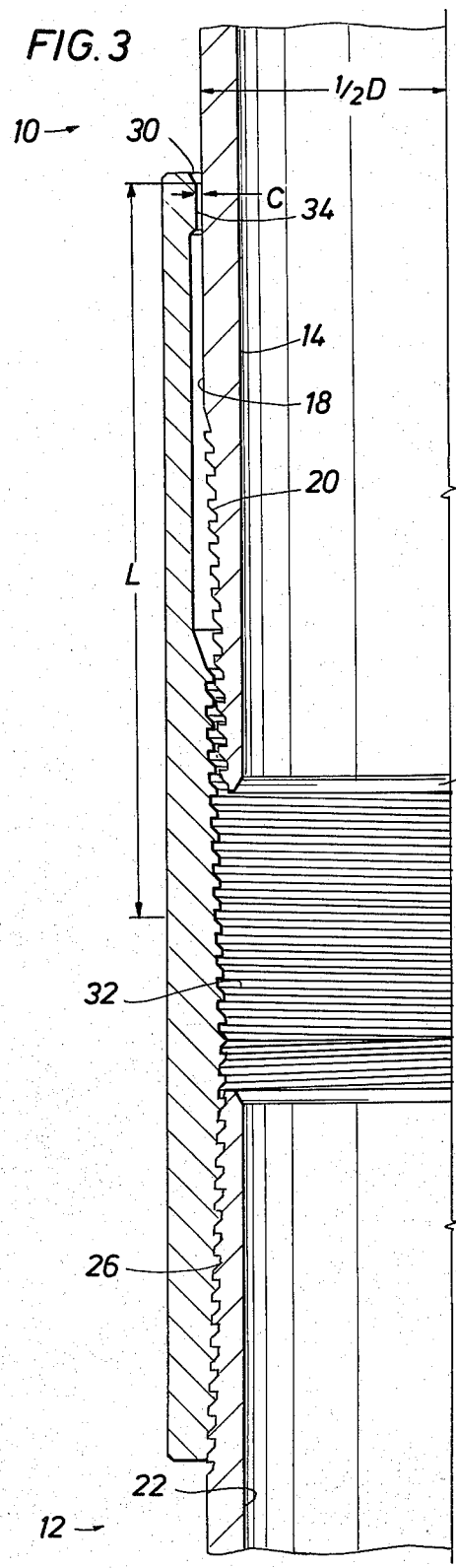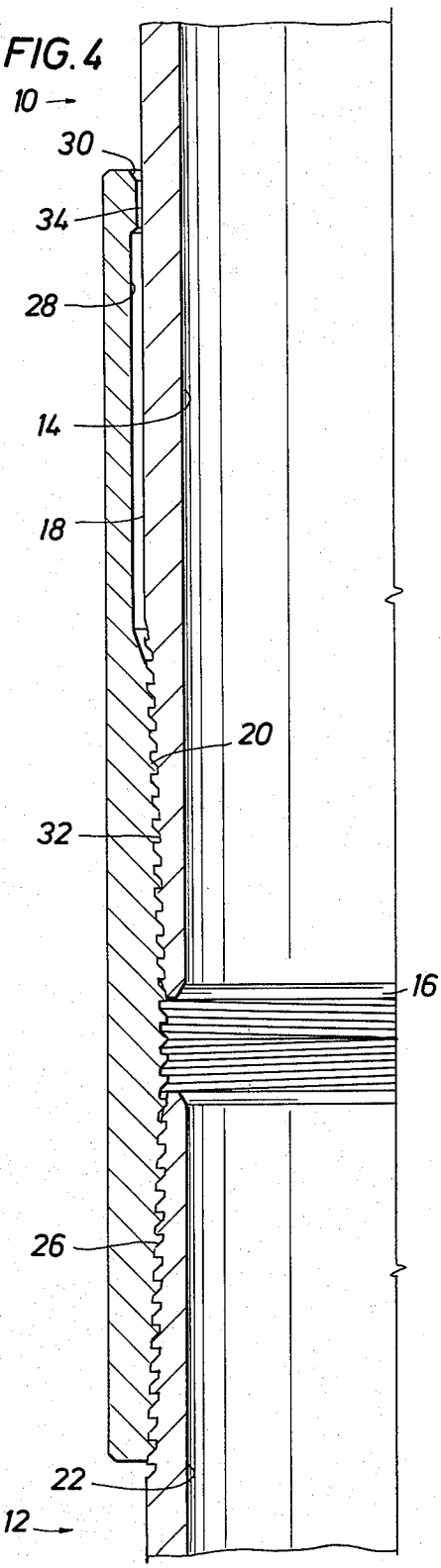

SELF-ALIGNING CONNECTOR ASSEMBLY

BACKGROUND OF THE INVENTION

1. Field of the Invention

The present invention relates to self-aligning connector apparatus. More particularly, the present invention pertains to threaded couplings, such as are utilized between pipe members and the like, and to techniques for aligning two members to be threadedly connected to avoid cross-threading, for example. The present invention finds particular application in the general area of drilling and working wells such as oil and gas wells, wherein tubing such as casing members of relatively large diameter are frequently connected together into strings by mutual threaded engagement.

2. Description of Prior Art

Threaded connections between pipe members are typically made by providing one end of one pipe member with a male connector in the form of an externally threaded pin member, and providing an end of the second pipe member with a female coupler in the form of an internally threaded box member which receives the pin member. The pin and box members may be integral parts of their respective pipe members, or may be added thereto by welding or threaded engagement, for example. In particular, various collars and nipples are known featuring combinations of two box ends, two pin ends, or a box end with a pin end for threaded connection to appropriate ends of two pipe members sought to be mutually connected. Additionally, various thread constructions are known, including tapered threads and straight threads, for example. The different threaded designs are intended to serve particular purposes in some instances. For example, an effective metal-to-metal fluid seal may be provided by joining complementarily tapered threads in a pin and box connection. Further, a variety of threads are known for use in various thread structures.

In the area of well casing, a standard design of eight round threads per inch or five buttress threads per inch may be used. The lengths of the threads in such cases range from about approximately two inches on relatively small outside diameter (OD) casing, such as five inch casing, to five inches on larger OD casing, such as twenty inch casing. Generally, as the OD of casing increases by a factor of four, the length of the threads on such casing only increases by a factor of two and a half. Additionally, the number of threads per inch for a given type of thread is generally the same for casing of all OD's. As a result, it may be expected to be more difficult to stab larger OD casing, and the likelihood of cross-threading the pin and box threads of such larger casing also increases.

It is desirable and advantageous to acquire a technique to assist in the alignment of pipe members for mutual threaded connection sufficiently to ensure that cross-threading between the pipe members cannot occur.

SUMMARY OF THE INVENTION

The present invention provides apparatus for connecting two members, including a first member having a generally tubular end and a guide surface positioned toward that end. Threads are positioned within the first member longitudinally spaced from the guide surface. A second member features second threads positioned externally thereon and toward an end of the second member. The second member also features an external surface longitudinally spaced from the second threads. The first and second threads are generally mutually complementary, and may threadedly connect the first and second members when the end of the second member is received within the generally tubular end of the first member. The guide surface cooperates with the external surface of the second member to limit rotational orientation between the first and second members when the second member extends within the first member prior to threaded engagement between the first and second threads.

The guide surface may comprise a generally annular surface. Also, the external surface of the second member may be provided by the external cylindrical surface of the pipe member. The internal diameter of the guide surface is greater than the external diameter of the external cylindrical surface such that, with the guide surface extending longitudinally sufficiently from the first threads, the orientation of the second member relative to the first member is so constrained that the first and second threads mutually engage without cross-threading.

The present invention provides a generally tubular member with means for carrying the tubular member by a first cylindrical member, and internal threads as part of the tubular member for receiving and threadedly engaging external threads carried by a second cylindrical member. The tubular member also includes means for guiding the second cylindrical member as that member is inserted within the tubular member, such means for guiding being axially spaced from the internal threads of the tubular member and on the opposite side thereof from the first cylindrical member. The means for guiding cooperates with the second cylindrical member to limit alignment thereof relative to the tubular member to prevent cross-thread engagement of the internal threads with the external threads.

The present invention provides an internally threaded box member carried by a first pipe member, for receiving and threadedly engaging an externally threaded pin member carried by a second pipe member, and a generally cylindrical internal guide surface carried by the box member for receiving and cooperating with the second pipe member for constraining orientation of the second pipe member relative to the first pipe member.

According to the present invention, one pipe or tubular member may be inserted within the guide surface of another pipe or tubular member whereby the guide surface cooperates with the external surface of the first member to constrain the mutual relative orientations of the first and second members so that the first member may be further inserted within the second member and the first and second members be threadedly engaged without cross-threading.

BRIEF DESCRIPTION OF THE DRAWINGS

FIG. 1 is a side elevation in quarter section of the pin end of a pipe member;

FIG. 2 is a side elevation in quarter section of the end of a pipe member fitted with a collar featuring a box connector and a guide surface, the connector of FIG. 2 being shown positioned below the pin end of FIG. 1 in general alignment therewith for mutual connection between the pipe members;

FIG. 3 is an enlarged partial longitudinal cross section of the components of FIGS. 1 and 2 combined, with the pin end of the pipe member of FIG. 1 inserted within the box connector of FIG. 2, but without mutual threaded engagement between the components;

FIG. 4 is a view similar to FIG. 3 but illustrating threaded connection between the pin and box connector.

DESCRIPTION OF ILLUSTRATED EMBODIMENTS

Figure 5:
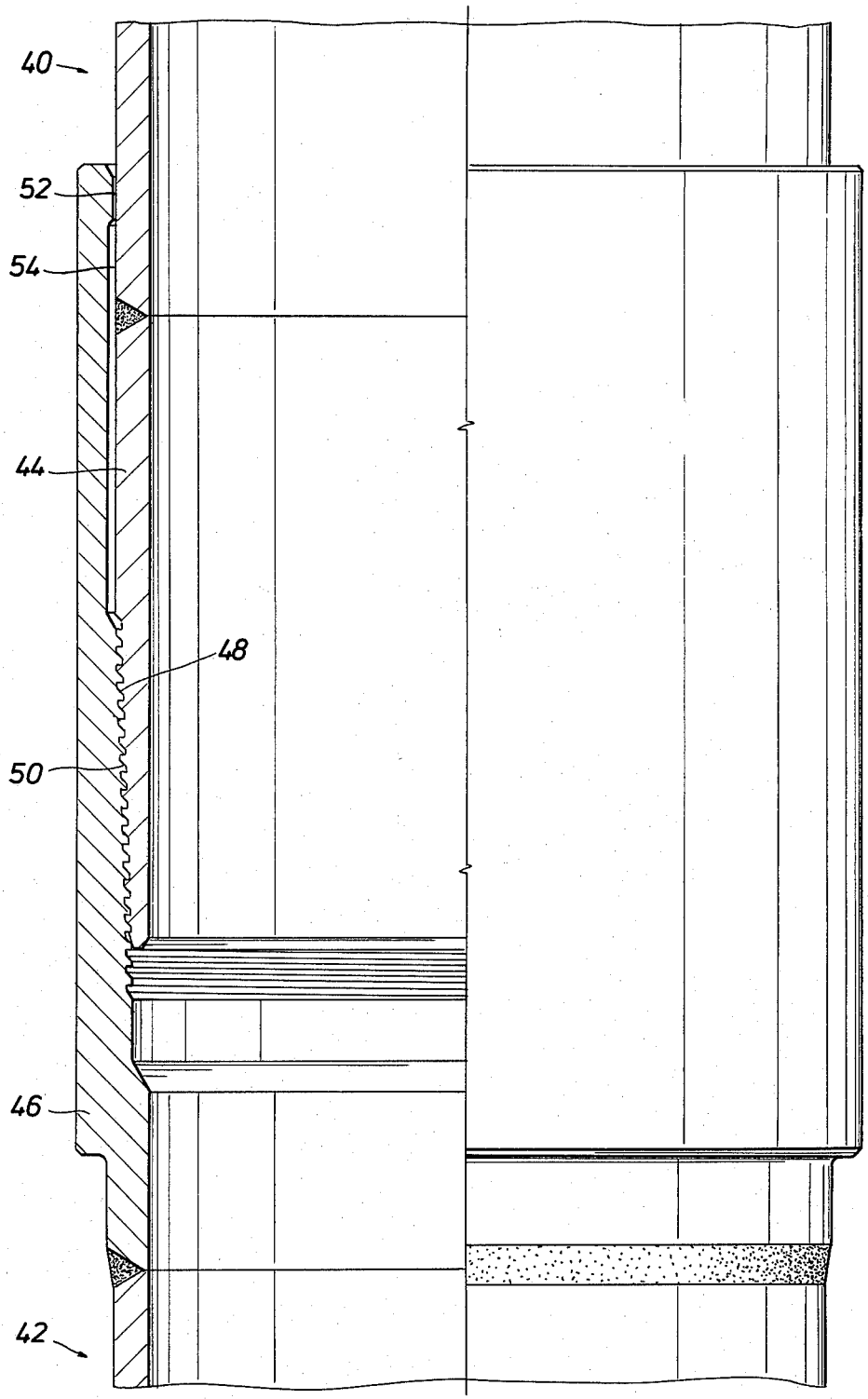
FIG. 5 is partial longitudinal cross section of the ends of two pipe members joined together by threaded engagement between a pin connector and a box connector welded to the respective pipe members and featuring a guide surface.

In FIG. 1, the end of a pipe member shown generally at 10 is illustrated positioned above the end of a second pipe member shown generally at 12 in FIG. 2, the two pipe members being generally axially aligned. The first pipe member 10 of FIG. 1 includes a longitudinally extending passage 14, ending in the open end 16. The generally cylindrical external surface 18 of the pipe member 10 is broken by tapered threads 20, which extend generally toward the open end 16. The second pipe member 12 of FIG. 2 features a longitudinally extending passage 22, which may be of the same internal diameter as the passage 14 of the first pipe member 10. The second pipe member passage 22 continues through a generally tubular connector in the form of a collar 24 which is fixed to the pipe member 12 by threaded engagement therebetween at 26. The thread structure illustrated for this purpose includes tapered threads carried on the exterior of the second pipe member 12 and complementarily tapered threads carried on the interior of the connector 24, although other thread arrangements could be utilized to mount the collar on the second pipe member.

The generally tubular connector 24 features a longitudinally extending internal passage 28 which communicates with the inner passage 22 and ends in the connector opening 30. The interior of connector 24 features a second threaded portion 32 which is tapered and generally complementary to the tapered threads 20 of the pin end of the first pipe member 10. An inwardly-facing generally annular guide surface 34 is positioned toward the connnector end 30.

The connector 24 provides an internally-threaded box end for the second pipe member 12, and further includes a guide surface 34 which is axially spaced from the threads 32. Additionally, since the connector 24 is joined to the second pipe member 12 by tapered threads at 26, such a connector may be provided at either end of a pipe member featuring pin connectors at its two ends.

As may be appreciated by reference to FIG. 3, the internal diameter (ID) of the guide surface 34 is slightly larger than the OD of the first pipe member external surface 18. The box connector 24 thus receives the first pipe member 10 but, as the first pipe member is inserted within the box connector, the guide surface 34 cooperates with the pipe member external surface 18 to constrain the first pipe member 10 relative to the box connector and the second pipe member 12, limiting the orientation of the first pipe member relative to the second pipe member. As the threads 20 of the first pipe member approach the threads 32 of the box connector 24, the guide surface 34 so limits the rotational orientation of the first pipe member 10 relative to the box connector that the first pipe member may not be sufficiently misaligned relative to the box connector to permit any of the threads 20 from engaging the connector threads 32 by a distance of even one thread out of place.

To ensure that cross-threading is prohibited by action of the guide surface 34 on the exterior surface 18 of the first pipe member 10 as the pin threads 20 reach the box threads 32, the relative diameters of the surfaces 34 and 18, the length of the connector 24 and the pitch of the threads 20 and 32 may be considered. It has been determined, for example, that cross-threading will be avoided where the axial displacement of the guide surface 34 generally from a point midway along the length of the threads 32, identified as L and illustrated in FIG. 2, is given by the following equation:

$$L = 2XDC,$$

where
X is the inverse of the pitch, or distance between adjacent threads, of the threads 20 and 32;
D is the OD of the external surface 18 of the first pipe member 10; and
C is one half the difference between the ID of the guide surface 34 and D.

It will be appreciated that cross-threading may be avoided where L is even greater than that determined by the foregoing equation, or where C is smaller than the equation requires. However, the value of C may be determined based in part on the tolerances with which the pipe member 10 and connector 24 are made. Additionally, to avoid unnecessary expense of manufacture, for example, the value of L may be maintained as small as possible while still ensuring the avoidance of cross-threading.

It will also be appreciated that the configuration of the box connector 24 may be varied and still achieve the avoidance of cross-threading. For example, the guide surface 34 is illustrated as an annular surface of relatively short longitudinal extent, and can be reduced even to use of a hole in a plate, for example. When the pin connector threads 20 are at the box threads 32, they cannot cross-thread as long as contact between the guide surface 34 and the cylindrical surface 18 is made a sufficient axial distance from the threads. However, it will be appreciated that the guide surface 34 may continue with the same ID to the beginning of the threads 32, for example, rather than the ID of the passage 28 expanding between the guide surface and the threads 32 as illustrated. The guide surface 34 is described herein as remote, or longitudinally spaced, relative to the box threads 32, for example, regardless of the longitudinal extent of the guide surface.

The pin end of the first pipe member 10 may enter the opening 30 and the guide surface 34 of the box connector 24 at virtually any angle, limited by the OD of that pipe member compared to the ID of the guide surface. As the first pipe member 10 is further inserted within the box connector 24 and the pipe end 16 is constrained within the connector, contact between the guide surface 34 and the pipe surface 18 forces the two pipe members 10 and 12 further into alignment. The farther the pin threads 20 are advanced beyond the box opening 30, the narrower is the angle of inclination permitted the first pipe member 10 relative to the second pipe member 12 by the contact between the pipe 16 with the box interior and the guide surface 34 with the pipe exterior surface 18. When the pin threads 20 reach the box threads 32, the permitted angle of inclination between the two pipe members is reduced to less than the angle of tilt required to cross-thread the pin and box threads.

With alignment of the first pipe member 10 relative to the box connector 24 assured by the cooperation of the guide surface 34 and the external cylindrical surface 18 of the first pipe member within limits required to avoid cross-threading, the first pipe member may be further manipulated within the box connector to engage the pin threads 20 with the box threads 22 as illustrated in FIG. 4. Relative rotation between the two pipe members about their common longitudinal axis may be employed to tighten the threaded connection between the first pipe member 10 and the box connector 24 to achieve, for example, a fluid-tight seal therebetween. Also, with the two pipe members joined by means of the box connector 24, the first pipe member internal passage 14 continues in communication with the second pipe member internal passage 22.

In FIG. 5 is illustrated a first pipe member shown generally at 40 connected to a second pipe member, shown generally at 42, by means of a threaded connection between a pin connector 44, fixed to the first pipe member by welding, and a box connector 46, mounted on the second pipe member by welding. The pin connector 44 features, toward its open end, tapered, external threads 48 which are generally complementary to the tapered, internal threads 50 included in the box connector 46. Toward its open end, the box connector 46 further includes an inwardly-facing generally cylindrical guide surface 52, which is slightly greater in ID than the OD of a generally cylindrical, exterior surface 54 of the pin connector 44. Aside from the manner in which the pin connector 44 and the box connector 46 are mounted on the first and second pipe members 40 and 42, respectively, the construction and function of the connector apparatus illustrated in FIG. 5 are generally the same as those of the corresponding connector apparatus illustrated in FIGS. 1–4. Further variations in the mounting of the connectors on the respective pipe members may also be utilized. For example, a box connector may be an integral part of a pipe member, in generally the same manner that the pin connector is provided on the first pipe member 10 in FIG. 1. Regardless of the method of construction or mounting one pipe member carries a pin end and the other pipe member carries a box connector with a guide surface.

The present invention provides a self-aligning connector, wherein two members may be mutually connected by threaded engagement. One member features external threads and an exterior surface axially spaced from the external threads. The other member carries internal threads and an internal guide surface axially spaced from the internal threads. The second member receives the first member, with the internal surface cooperating with the external surface to limit rotational orientation between the two members so that, as the internal and external threads contact and mutually engage, cross-threading is avoided.

The foregoing disclosure and description of the invention is illustrative and explanatory thereof, and various changes in the method steps as well as in the details of the illustrated apparatus may be made within the scope of the appended claims without departing from the spirit of the invention.

I claim:

1. Apparatus for connecting tubular members of any size diameters, while preventing cross-threading, comprising:
   a. a first tubular member having tapered, external threads toward a first end thereof;
   b. a generally cylindrical external surface, as part of said first tubular member, axially displaced relative to said external threads and on the opposite side thereof from said first end;
   c. a second tubular member having generally circular guide means toward a first end thereof;
   d. said second tubular member further having tapered, internal threads generally complementary to said external threads, and axially displaced relative to said guide means;
   e. wherein:
      i. L is the axial displacement between said guide means and said internal threads;
      ii. X is the inverse of the axial distance between adjacent threads of said external threads;
      iii. D is the outside diameter of the external surface;
      iv. C is one-half the difference between the inside diameter of said guide means and D; and
      v. L is at least as large as the quantity 2XDC;
   f. so that said first and second tubular members, regardless of their respective diameter sizes, may be threadedly connected by means of said external threads and said internal threads with said second tubular member generally receiving said first tubular member, said guide means cooperating with said external surface of said first tubular member, and L being sufficiently large, to limit the range of relative rotational orientation between said first and second tubular members with said first tubular member extending within said second tubular member a sufficient distance for said external and internal threads to make contact and prior to rotational thread make-up of said external and internal threads, said limited relative rotational orientation range being sufficiently small as to prevent cross-threading of said external and internal threads during rotational thread make-up.

2. Apparatus as defined in claim 1 wherein said guide means comprises a generally cylindrical internal surface.

3. Apparatus for connecting tubular members of any size diameters, while preventing cross-threading, comprising:
   a. a first tubular member having tapered, external threads toward a first end thereof;
   b. a generally cylindrical external surface, as part of said first tubular member, axially displaced relative to said external threads and on the opposite side thereof from said first end;
   c. a second tubular member having generally circular guide means toward a first end thereof;
   d. said second tubular member further having tapered, internal threads generally complementary to said external threads, and axially displaced relative to said guide means;
   e. wherein:
      i. L is the axial displacement between said guide means and said internal threads;
      ii. X is the inverse of the axial distance between adjacent threads of said external threads;
      iii. D is a minimum limit for the outside diameter of the external surface;

iv. C is a maximum limit for one-half the difference between the inside diameter of said guide means and D; and v. L is at least as large as the quantity 2XDC;

f. so that said first and second tubular members, regardless of their respective diameter sizes, may be threadedly connected by means of said external threads and said internal threads with said second tubular member generally receiving said first tubular member, said guide means cooperating with said external surface of said first tubular member, and L being sufficiently large, to limit the range of relative rotational orientation between said first and second tubular members with said first tubular member extending within said second tubular member a sufficient distance for said external and internal threads to make contact and prior to rotational thread make-up of said external and internal threads, said limited relative rotational orientation range being sufficiently small as to prevent cross-threading of said external and internal threads during rotational thread make-up.

4. Apparatus as defined in claim 3 wherein said guide means comprises a generally cylindrical internal surface.

* * * * *